March 14, 1961  D. P. WELLES, JR  2,974,965
TOOL HOLDER AND EXPENDABLE TOOL
Filed March 21, 1958  2 Sheets-Sheet 1
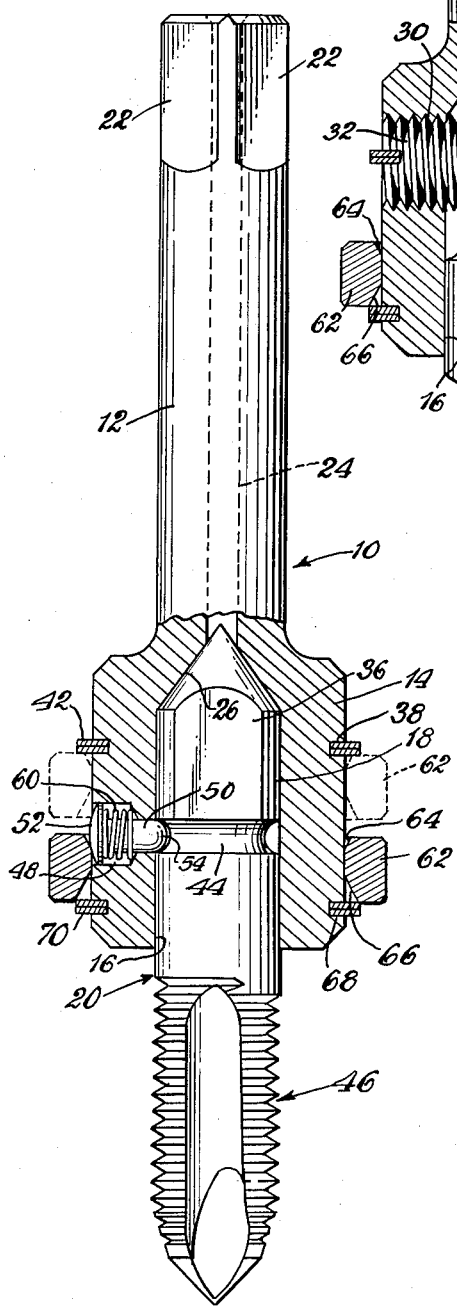
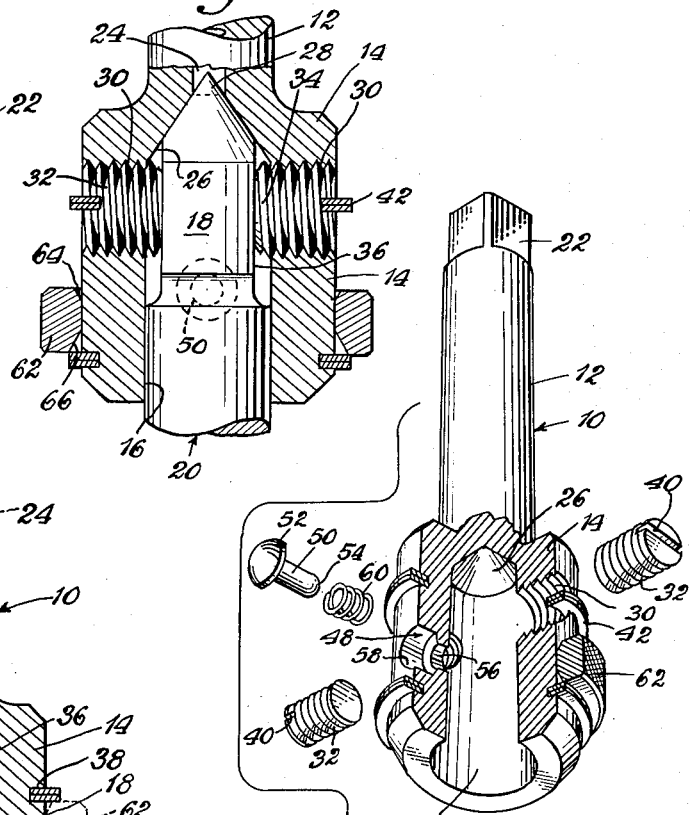
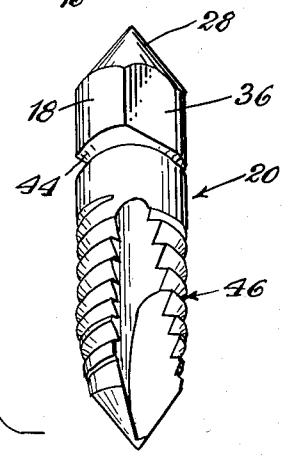
INVENTOR.
Donald P. Welles, Jr.
BY
Parker & Carter
Attorneys

United States Patent Office 2,974,965
Patented Mar. 14, 1961

2,974,965
TOOL HOLDER AND EXPENDABLE TOOL

Donald P. Welles, Jr., Rockford, Ill., assignor to Besly-Welles Corporation, South Beloit, Ill., a corporation of Illinois Filed Mar. 21, 1958, Ser. No. 722,953

6 Claims. (Cl. 279—83)

My invention is in the field of cutting tools and is in the nature of a combination tool holder and cutting tool constructed to reduce the cost of simple cutting tools, for example taps and the like.

A primary object of my invention is a new and improved combination tool holder and expendable cutting tool.

Another object is a new and improved method or way of releasably holding a cutting tool in a tool holder.

Another object is a new and improved interlock between a tool holder and cutting tool, be it a tap or otherwise.

Another object is a combination tool having a permanent shank releasably interlocked with an expendable cutting bit.

Another object is a combination tool of the above type which is simple and, therefore, inexpensive to manufacture.

Another object is an interlock between a tool holder and an expendable cutting tool which positively interlocks the two except when the operator wants to remove the expendable cutting tool.

Other objects will appear from time to time in the ensuing specification and drawings in which:

Figure 1 is a side view, partly in section, of my combination tool holder and cutting tool;

Figure 2 is a side view, partly in section, of a portion of Figure 1, but at right angles to it;

Figure 3 is an exploded perspective; and

Figure 4:
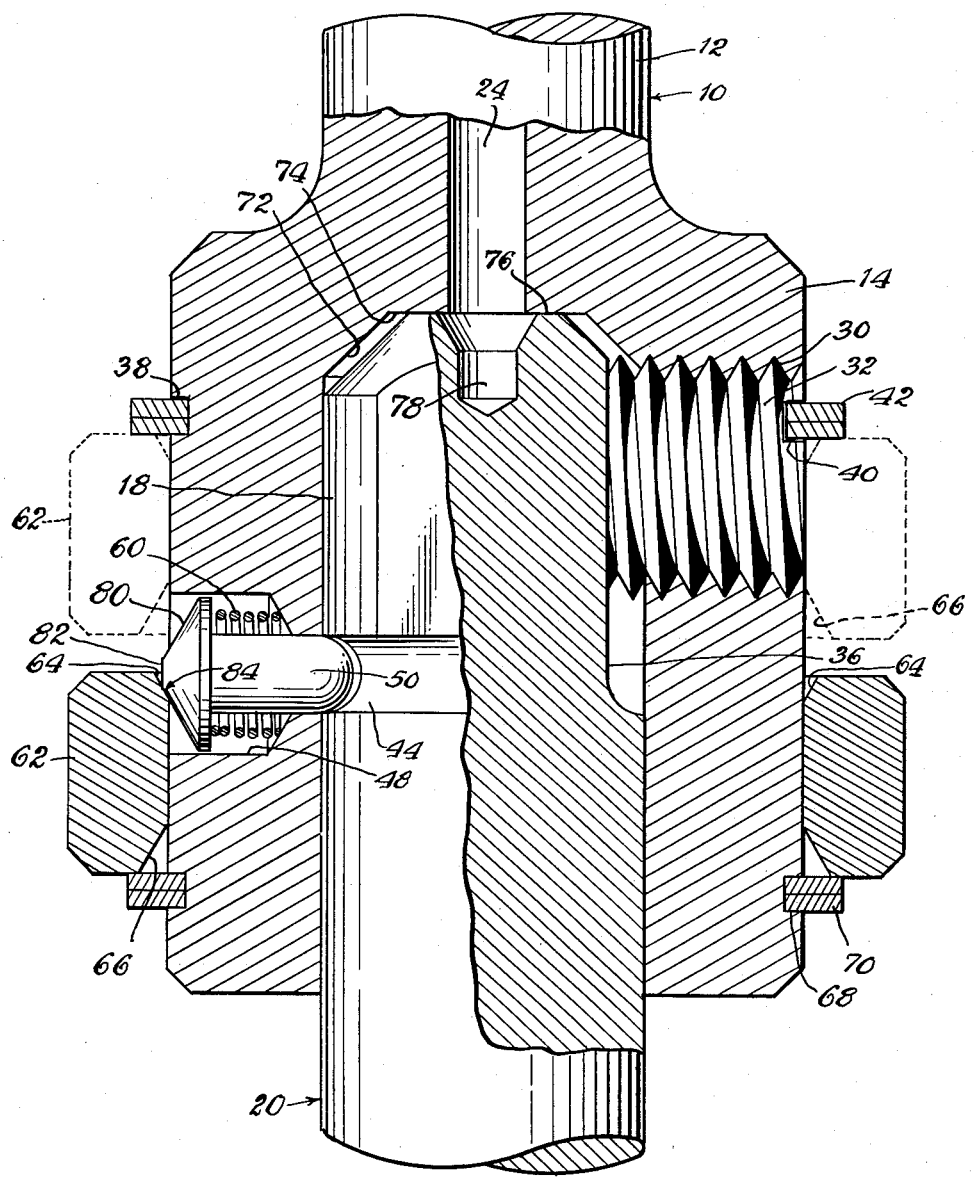
Figure 4 is a side view, similar to Figure 1, of a variation on an enlarged scale, on a right angle section, similar to Figure 3.

In Figure 1 a tool holder, indicated generally at 10, has a shank 12 and a somewhat enlarged socket or head 14 at one end. The head 14 has a suitable bore 16 which accepts the shank 18 of a cutting tool 20, shown in this case as a tap but it might be otherwise.

The shank 12 of the tool holder may have suitable flats 22 ground, milled or otherwise formed on one end. I provide a suitable axially disposed knock out hole 24 extending from one end of the shank through the tool holder and opening in the socket 16 so that if the cutting tool 20, for any reason, becomes lodged or otherwise stuck in the socket, I may insert a rod through the passage or hole 24 to knock the cutting tool out of the tool holder. The knock out passage or channel 24 may open into a somewhat conical or concave portion or seat 26 in the socket which may serve or function as a piloting seat for a conical or pointed or convex portion 28 on the shank or rear end of the cutting tool.

It will be noted that the shank of the cutting tool has a diameter that corresponds roughly to but is slightly less than the diameter of the bore or socket 16 of the tool holder so that the cutting tool will fit snugly but releasably with a relatively tight fit in the socket.

As shown in Figure 2 I provide two threaded radially disposed passages or holes 30 which project through the enlarged head or body 14 of the socket and open from opposite sides into the bore 16. These passages might be considered to be opposed or opposite each other or, roughly, 180° apart. Each such passage has a drive screw 32 which, when fully inserted so that its outer surface is generally coincident with the cylindrical exterior of the head, projects slightly into the socket, note the projecting portion designated 34 in Figure 2. I provide drive flats 36 on opposite sides of the shank 18 of the cutting tool which engage the inner ends of the drive screws 32, such as shown in Figure 2. These flats may be ground, milled or otherwise formed on the shank 18. To fully insert the cutting tool, the operator must rotate it until the drive flats 36 are aligned with the ends of the screws after which the cutting tool may be fully inserted until the pointed end 28 fits fully in the socket 26.

I provide an annular channel or groove 38 around the cylindrical exterior of the head or socket which, as will be noted in Figure 3, crosses the threaded holes 30. I also provide a locking slot 40 in the outside of each of the screws 32, and either a retaining ring 42 or one continuous snap ring with two throws is disposed in the groove 38 and extends through the locking slot 40 in each of the screws 32. It will thus be seen that the snap ring prevents the screws 32 from turning.

At a suitable location on the shank 18 of the cutting tool 20 I provide a continuous retaining groove 44, which is shown as disposed approximately midway between the pointed end 28 and the working surface 46 of the cutting tool, shown in this case with the threads and flutes of a tap, although it might be otherwise. In a suitable socket or chamber 48 in the enlarged head portion of the tool holder I provide a retaining pin 50 which has a rounded or conical head 52 and a projecting shank terminating in a well rounded lower or inner end portion 54. As will be seen in Figures 1 and 3, the socket or passage 48 includes a smaller portion 56 which opens into the bore 16 of the tool holder and the somewhat larger portion 58 adapted to accept the rounded head 52 of the retaining pin 50. I provide a suitable coil spring 60 or the like under the head of the retaining pin which is adapted to bias the retaining pin outwardly at all times.

It should be noted in Figure 1 that the inner somewhat rounded portion 54 of the retaining pin is adapted to project into the retaining groove 44 on the cutting tool. In effect, the driving flats 36 and screws 32 interlock the tool holder and cutting tool rotatively while the retaining pin 50 and retaining groove 44 interlock them axially.

I provide a lock ring 62 around the exterior of the head or socket which is constructed to slide axially somewhat. For example, I show two positions in Figure 1, one in full lines and the other in broken lines. The rear inner edge of the locking ring, as at 64, is relieved somewhat to provide a camming surface. The forward inner edge, as at 66, of the locking ring is relieved a good bit more to also provide a camming surface.

I provide a suitable groove or notch 68 adjacent the forward edge or toward the forward end of the head 14 which accepts a retaining ring 70.

In Figure 4 I have shown a variation in which some of the same reference numerals have been applied to the same parts. The bore of the head is provided with a partly conical or concave seat, at its rear end, designated 72, which flows into or has a flat blunt surface 74 which is generally at right angles to the axis of the bore. The rear end of the cutting tool has a corresponding flat portion 76 which, when the tool is fully inserted, as shown in Figure 4, abuts the blunt wall 74. By this structure, the accuracy required for the conical portion 28 and the seat 26 in the Figure 2 form is avoided. Also, I may provide a center 78 which may be used to support the cutting tool during machining.

Whereas the retaining pin 50 in Figure 3 is shown with a domed or rounded head 52, in the Figure 4 form the retaining pin is shown with a conical portion 80 which is flattened at 82. It will be noted that the relieved inner edge 64 of the locking ring 62 slides past the flat end 82 of the pin so that the spring moves the pin out slightly. The conical surface 64 of the locking ring 62 and the conical portion 80 of the pin overlap slightly, as at 84, so that a relatively tight interlock is provided preventing the locking ring from moving unauthorizedly from the locked position, shown in full lines in Figure 4, to the unlocked position shown in broken lines.

In either the Figure 2 or Figure 4 form, the slight interlock provided between the relieved edge and the locking ring and the rounded or conical head of the retaining pin prevents the cutting tool from loosening in the holder. Since the tool will be turning at relatively high speed in use, the spring biasing the retaining pin outwardly will be augmented by centrifugal force so that there is relatively little chance of the cutting tool loosening in the holder.

I prefer the Figure 4 form since an accurate relation can be held between the locking groove and the blunt end 76 since both can be made in the same machining operation by a single tool. But, both forms have advantages.

The use, operation and function of my invention are as follows:

The tool holder 10, as such, is a permanent item, while the cutting tool 20 is formed as an insert and when worn sufficiently may be disposed of and a new one inserted. In this sense, the cutting tool, be it a tap or otherwise, is expendable. The advantage of this is that the cutting tool itself has only a short shank and, accordingly, very little material is lost when the cutting tool is worn out and thrown away. Also, the cutting tool must be made of a higher grade of steel than the tool holder and, accordingly, I side-step having to dispose of the unused integral extended shank of a cutting tool, which also must be a high grade tool steel.

Additionally, the lock ring 62 is adapted to slide between an operative and an inoperative position. In the withdrawn or inoperative position, as shown in broken lines in Figure 1, its extent of movement is defined by the snap ring 42. It will be noted that this is the same snap ring that prevents unauthorized movement of the drive screws 32. When the cutting tool 20 has been preliminarily inserted, rotated somewhat until the flats 36 are aligned with the ends 34 of the screws 32 and then fully inserted until the tapered portion 28 seats in the socket or seat portion 26, the lock ring 62 is slipped forward. The forward camming surface 66 engages the conical head 52 of the retaining pin forcing it inwardly, thereby commpressing the spring 60. This forces the inner end 54 of the pin into the retaining groove 44.

The snap ring 70 defines the forward or active position of the lock ring 62. It will be noted, as shown in full lines in Figure 1, that when the lock ring 62 is in its forward position, the relieved or cam rear edge 64 of the lock ring passes slightly over the domed head 52 of the retaining pin so that the spring 60 may force the retaining pin 50 out slightly. But at the same time the rounded inner end 54 of the pin is retained well down in the retaining groove 44 of the cutting tool. The point is that the action of the relieved or cam surface 64 on the ring and the domed head of the retaining pin releasably locks the lock ring in its forward position. To remove the cutting tool, the operator must exert some pressure to force the lock ring rearwardly, thereby depressing the retaining pin 50 slightly. Thereafter, the lock ring 62 may be easily moved to the broken line position in Figure 1.

The snap rings 42 and 70 define the two positions of the lock ring. I may knurl or otherwise suitably condition the outer surface of the lock ring, such as shown in Figure 3, to increase friction, but this is not absolutely necessary. Also, the snap ring 42 locks the driving screws against rotation so that once the screws have been fully seated and the ring snapped in place, the screws cannot work themselves either in or out.

While I have shown and described the preferred form and suggested several modifications of my invention, it should be understood that suitable additional modifications, changes, alterations and variations may be made without departing from the invention's fundamental theme. I, therefore, wish that my invention be unrestricted except as by the appended claims.

I claim:

1. In a combination tool, a tool holder having a shank with a socket at one end, a cutting tool having a shank portion seated in the socket, a driving element disposed radially in the socket of the tool holder, a driving flat on the shank portion of the cutting tool adapted to be engaged by the driving element so as to rotatively interlock the tool holder and cutting tool but at the same time providing free axial relative movement, an interlock between the socket and the shank of the cutting tool adapted to releasably interlock the tool holder and the cutting tool axially, manually operable means on the outside of the socket for actuating the interlock, and a retaining ring on the outside of the socket engaging and interlocking with the radially disposed driving element to prevent unauthorized movement thereof and defining an extreme position of adjustment of the manually operable means.

2. The structure of claim 1 in which the interlock includes a retaining element disposed radially in a bore in the body of the socket and constructed for axially slideable movement, a spring for biasing the retaining element outwardly, and a locking ring adapted to bias the retaining element inwardly, and further including a continuous annular locking groove in the shank of the cutting tool adapted to be engaged by the retaining element when it is biased inwardly by the locking ring.

3. In an expendable tool combination, a tool holder having a shank with a generally cylindrical socket at one end, an expendable cutting tool having a shank portion adapted to be inserted and seated in the socket, at least one radial hole in the body of the socket, a driving screw threaded in the radial hole, at least one driving flat on the shank portion of the cutting tool adapted to be engaged by the driving screw to rotatively interlock the tool holder and cutting tool, a retaining element in the body of the socket to axially and releasably interlock the tool holder and cutting tool, an axially slideable lock ring on the outside of the body of the socket constructed to actuate the retaining element so as to axially interlock the tool holder and cutting tool in an axial position of the lock ring and to release the retaining means so as to release the tool holder and cutting tool in another axial position of the lock ring, and an annular snap ring around the outside of the body of the socket interlocking with the driving screw to strain it against unauthorized rotation and, at the same time, projecting above the surface of the body of the socket to define one extreme position of axial movement of the lock ring.

4. The structure of claim 3 further characterized by and including a knock out hole axially disposed in the shank of the tool holder opening into the socket.

5. The structure of claim 3 further characterized by and including a resilient element for biasing the retaining element to inoperative position at all times.

6. The structure of claim 3 further characterized in that the body of the socket has two radial holes, 180° apart, a drive screw for each such hole, the annular snap ring interlocking with both drive screws, and driving flats on each side of the shank of the cutting tool for engagement with the inner ends of the drive screws.

(References on following page)

References Cited in the file of this patent

UNITED STATES PATENTS

| | | |
|---|---|---|
| 943,863 | Clouse | Dec. 21, 1909 |
| 1,784,026 | Olson | Dec. 9, 1930 |
| 2,354,160 | Wallgren | July 18, 1944 |
| 2,731,273 | Edens | Jan. 17, 1956 |
| 2,767,992 | Emrick | Oct. 23, 1956 |
| 2,807,473 | Kiehne | Sept. 24, 1957 |

FOREIGN PATENTS

| | | |
|---|---|---|
| 1,036,250 | France | Apr. 22, 1953 |